(12) United States Patent
Akaike et al.

(10) Patent No.: US 9,783,088 B2
(45) Date of Patent: Oct. 10, 2017

(54) VEHICLE SEAT

(71) Applicant: TOYOTA BOSHOKU KABUSHIKI KAISHA, Aichi-ken (JP)

(72) Inventors: Fumitoshi Akaike, Miyoshi (JP); Akari Takahashi, Seto (JP)

(73) Assignee: TOYOTA BOSHOKU KABUSHIKI KAISHA, Aichi-ken ( * ) Notice: Subject to any disclaimer, the term of this patent is extended or adjusted under 35 U.S.C. 154(b) by 0 days.

(21) Appl. No.: 14/712,250

(22) Filed: May 14, 2015

(65) Prior Publication Data

US 2015/0329029 A1 Nov. 19, 2015

(30) Foreign Application Priority Data

May 15, 2014 (JP) .................. 2014-101202

(51) Int. Cl.
*A47C 7/72* (2006.01)
*B60N 2/56* (2006.01)
(Continued)

(52) U.S. Cl.
CPC ......... *B60N 2/5657* (2013.01); *B60N 2/5642* (2013.01); *B60N 2/646* (2013.01);
(Continued)

(58) Field of Classification Search
CPC .. B60N 2/5678; B60N 2/5635; B60N 2/5685; B60N 2/5657; B60N 2/56; B60N 2/5621; B60N 2/5642; B60N 2/646
(Continued)

(56) References Cited

U.S. PATENT DOCUMENTS 6,179,706 B1  1/2001  Yoshinori et al.
6,629,725 B1  10/2003  Kunkel et al.
(Continued)

FOREIGN PATENT DOCUMENTS

CN  1792671  6/2006
CN  101522467  9/2009
(Continued)

OTHER PUBLICATIONS

Chinese Office Action for CN App. No. 201510250528.9 mailed on Dec. 27, 2016, along with English-language translation thereof.
(Continued)

*Primary Examiner* — Chi Q Nguyen
(74) *Attorney, Agent, or Firm* — Greenblum & Bernstein, P.L.C.

(57) ABSTRACT

A vehicle seat includes a pad configured to support a body of a seated occupant. The pad has a transverse air passage extending in a direction along a back surface of the pad and a plurality of longitudinal air passages each having one end connecting with the transverse air passage and the other end open to a front surface of the pad. The transverse air passage has a first transverse air passage connecting an air introduction hole from a fan or an air discharge hole to the fan and the longitudinal air passage directly with each other, and a second transverse air passage connecting the air introduction hole or the air discharge hole and the longitudinal air passage with each other via a resistant body having a resistance against an air flow.

4 Claims, 6 Drawing Sheets

(51) Int. Cl.
*B60N 2/64* (2006.01)
*B60N 2/66* (2006.01)
*B60N 2/70* (2006.01)

(52) U.S. Cl.
CPC ............. *B60N 2/66* (2013.01); *B60N 2/7094* (2013.01); *B60N 2/56* (2013.01); *B60N 2/5621* (2013.01); *B60N 2/5635* (2013.01); *B60N 2/5678* (2013.01); *B60N 2/5685* (2013.01)

(58) Field of Classification Search
USPC ............. 297/452.46, 452.47, 180.13, 180.14
See application file for complete search history.

(56) References Cited

U.S. PATENT DOCUMENTS

| | | | | |
|---|---|---|---|---|
| 6,685,553 | B2* | 2/2004 | Aoki | B60N 2/5635 |
| | | | | 297/180.14 |
| 6,848,742 | B1* | 2/2005 | Aoki | B60N 2/5635 |
| | | | | 297/180.14 |
| 6,928,829 | B2* | 8/2005 | Kamiya | B60N 2/0244 |
| | | | | 297/452.42 |
| 6,929,322 | B2* | 8/2005 | Aoki | B60H 1/00285 |
| | | | | 297/180.13 |
| 2004/0164594 | A1* | 8/2004 | Stoewe | B60N 2/5657 |
| | | | | 297/180.14 |
| 2004/0198212 | A1 | 10/2004 | Aoki et al. | |
| 2005/0121965 | A1* | 6/2005 | Stowe | B60N 2/5685 |
| | | | | 297/452.42 |
| 2006/0038432 | A1* | 2/2006 | Koehler | B60N 2/5825 |
| | | | | 297/180.1 |
| 2006/0138811 | A1* | 6/2006 | Pfahler | B60N 2/5635 |
| | | | | 297/180.14 |
| 2006/0175877 | A1* | 8/2006 | Alionte | A47C 7/74 |
| | | | | 297/180.14 |
| 2006/0249996 | A1* | 11/2006 | Eberl | A47C 7/74 |
| | | | | 297/180.14 |
| 2007/0120401 | A1* | 5/2007 | Minuth | B60N 2/5621 |
| | | | | 297/180.14 |
| 2009/0031742 | A1* | 2/2009 | Seo | B60N 2/5657 |
| | | | | 62/244 |
| 2009/0079236 | A1* | 3/2009 | Itou | B60N 2/5635 |
| | | | | 297/180.1 |

FOREIGN PATENT DOCUMENTS

| | | |
|---|---|---|
| JP | 2003-235676 A | 8/2003 |
| JP | 2009-502279 A | 1/2009 |
| JP | 2009-77760 | 4/2009 |
| JP | 2012-000336 | 1/2012 |
| JP | 2012-224234 | 11/2012 |
| JP | 2013-233860 | 11/2013 |

OTHER PUBLICATIONS

Japanese Office Action issued with respect to counterpart Japanese Application No. 2014-101202, dated Jun. 20, 2017 (with partial English-language translation).

* cited by examiner

VEHICLE SEAT

INCORPORATION BY REFERENCE

The disclosure of Japanese Patent Application No. 2014-101202 filed on May 15, 2014 including the specification, drawings and abstract is incorporated herein by reference in its entirety.

BACKGROUND OF THE INVENTION

1. Field of the Invention

The invention relates to a vehicle seat and specifically relates to a vehicle seat having a function of sending air to a seated occupant or sucking air in the vicinity of a seated occupant.

2. Description of Related Art

There is known a vehicle seat having an air conditioning function to send air to the body of a seated occupant from the back side or to suck air in the vicinity of a seated occupant toward the back side, via a pad serving as a cushion material. In a vehicle seat described in Japanese Patent Application Publication No. 2013-233860 (JP 2013-233860 A), in order to allow air from a fan to be dispersed widely in directions along a back surface of a pad on the back surface side so as to be supplied into the pad, the back surface of the pad is provided with a plurality of recess shaped air passages extending in the directions along the back surface of the pad. The air passages may alternatively be air passages that are configured to allow air sucked via a plurality of portions of a seating surface of a pad to be concentrated in directions along a back surface of the pad on the back surface side so as to be sent to a fan.

SUMMARY OF THE INVENTION

In the technique described in JP 2013-233860 A, through holes are disposed at predetermined positions of the pad to establish communication between its seating surface and its back surface and to communicate with the fan via the air passages provided on the back surface of the pad so that air can be supplied or sucked by the fan. With this configuration, however, the air supply/suction amounts via the respective through holes, are determined spontaneously. That is, the air supply/suction amount via the through hole provided at a portion, near the fan, of the air passage becomes relatively large, while the air supply/suction amount via the through hole provided at a portion, far from the fan, of the air passage becomes relatively small. Accordingly, it is difficult to ensure the comfort of a seated occupant more efficiently by increasing the amount of air at a portion, requiring more air, of the body of the seated occupant and by decreasing the amount of air at a portion, requiring not so much air, of the body of the seated occupant.

The invention provides a vehicle seat having an air conditioning function that can send or suck a necessary amount of air for each of portions of the body of a seated occupant.

A vehicle seat according to an aspect of the invention includes a pad configured to support a body of a seated occupant. The pad has a transverse air passage extending in a direction along a back surface of the pad and a plurality of longitudinal air passages each having one end connecting with the transverse air passage and the other end open to a front surface of the pad. The transverse air passage has a first transverse air passage connecting an air introduction hole from a fan or an air discharge hole to the fan and the longitudinal air passage directly with each other, and a second transverse air passage connecting the air introduction hole or the air discharge hole and the longitudinal air passage with each other via a resistant body having a resistance against an air flow.

According to the above-described aspect, air from or to the fan is supplied or discharged to or from the longitudinal air passage, connecting with the first transverse air passage, not via the resistant body, while air from or to the fan is supplied or discharged to or from the longitudinal air passage, connecting with the second transverse air passage, via the resistant body. Consequently, the amount of air supplied from or discharged to the fan can be changed depending on whether or not air passes through the resistant body. That is, it is possible to ensure the comfort of a seated occupant more efficiently by supplying or discharging air via the first transverse air passage to increase the amount of air at a portion, requiring more air, of the body of the seated occupant and by supplying or discharging air via the second transverse air passage to decrease the amount of air at a portion, requiring not so much air, of the body of the seated occupant.

In the above-described aspect, the resistant body may be a three-dimensional fabric.

According to the above-described configuration, by disposing the three-dimensional fabric at a necessary portion in the second transverse air passage, it is possible to give resistance against the air flow passing therethrough. Consequently, it is possible to easily change the supply or discharge amount of air via the longitudinal air passage connecting with the first transverse air passage and the supply or discharge amount of air via the longitudinal air passage connecting with the second transverse air passage. Herein, the three-dimensional fabric is a permeable three-dimensional fabric made of three-dimensional net, double raschel, or the like.

In the above-described configuration, the first transverse air passage and the second transverse air passage may be formed by a recess shaped groove provided on the back surface side of the pad and a non-permeable planar member stretched on the back surface side of the pad, and the three-dimensional fabric may be disposed in abutment with the non-permeable planar member in the second transverse air passage.

According to the above-described configuration, the first transverse air passage and the second transverse air passage are formed by the recess shaped groove provided on the back surface side of the pad and the non-permeable planar member stretched on the back surface side of the pad, and the three-dimensional fabric is disposed in abutment with the non-permeable planar member in the second transverse air passage. Consequently, the second transverse air passage can be provided only by disposing the three-dimensional fabric in abutment with the non-permeable planar member at a portion corresponding to the second transverse air passage so that it is possible to easily provide the first transverse air passage and the second transverse air passage.

In the above-described configuration, the three-dimensional fabric may have a size to cover the second transverse air passage and at least part of the first transverse air passage and may be placed on the non-permeable planar member, wherein the three-dimensional fabric may be disposed by being thermally bonded to the non-permeable planar member at a portion corresponding to the first transverse air passage.

According to the above-described configuration, by thermally bonding the three-dimensional fabric at its portion, corresponding to the first transverse air passage, to the non-permeable planar member, the three-dimensional fabric at its portion corresponding to the first transverse air passage is fixed to the non-permeable planar member in a state of having no resistance force against the air flow. That is, it is possible to dispose the first transverse air passage and to fix the three-dimensional fabric to the non-permeable planar member at the same time. Consequently, processes of cutting the three-dimensional fabric into a required shape and bonding it to the non-permeable planar member are simplified and, therefore, it is possible to manufacture the vehicle seat of the invention more efficiently.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 6 show a first embodiment of the invention. In the figures, arrows indicate directions of a vehicle when a vehicle seat is attached to a floor of the vehicle. In the following description, a description about directions will be based on these directions.

Figure 1:
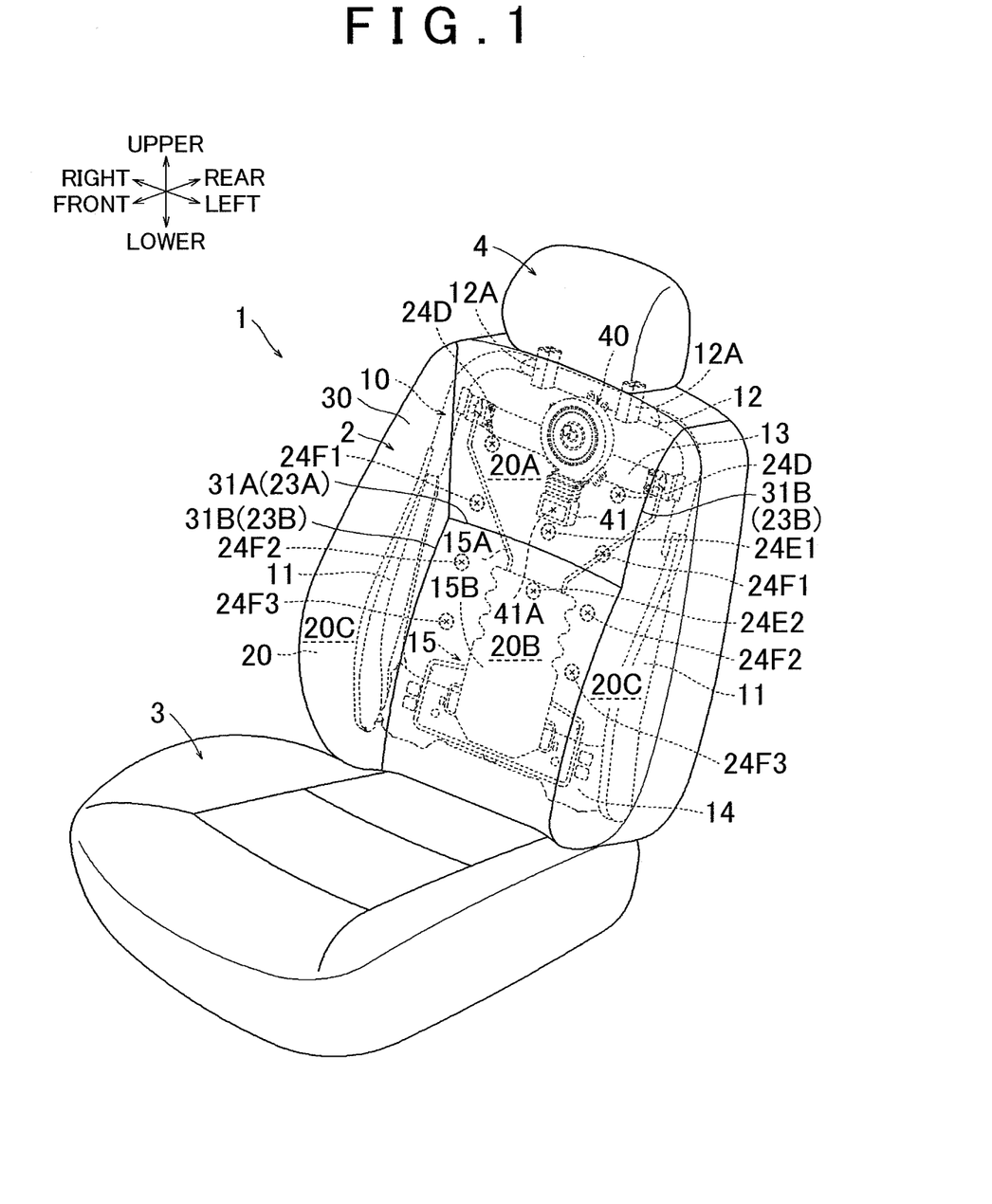
FIG. 1 is a perspective view showing the external appearance of a vehicle seat according to a first embodiment of the invention.
Figure 2:
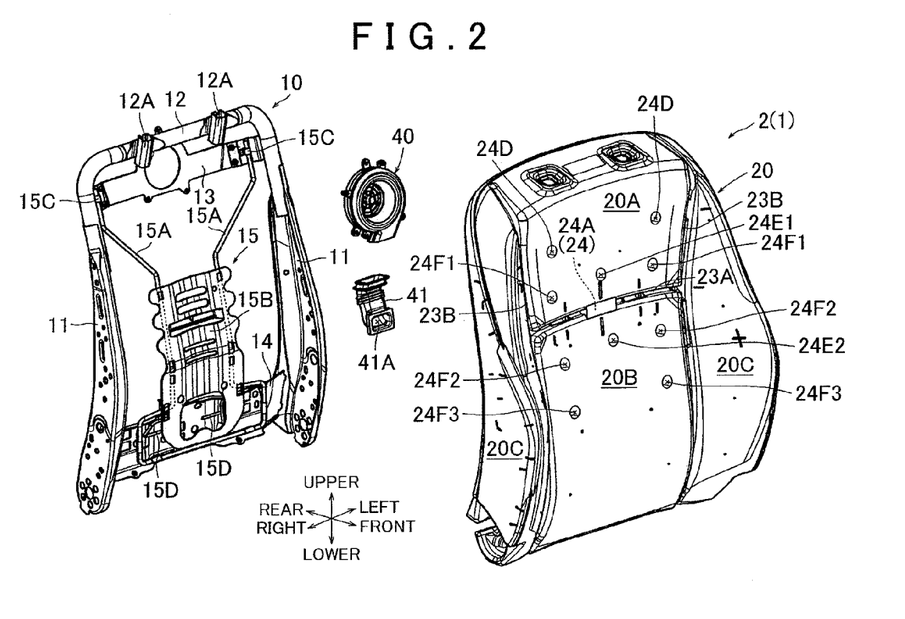
FIG. 2 is an exploded perspective view of a seat back, in the state where a seat cover is removed, according to the first embodiment.
Figure 3:
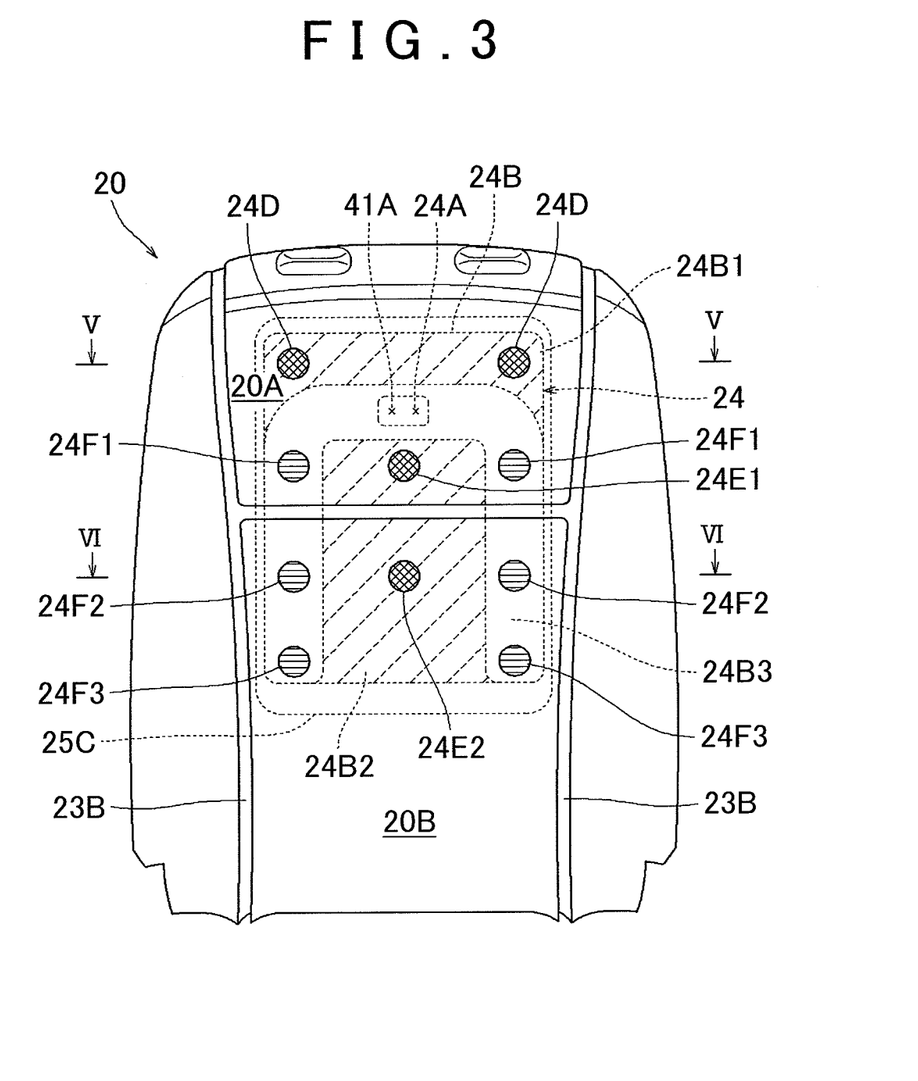
FIG. 3 is a front view of a back pad as seen from the front side according to the first embodiment.
Figure 4:
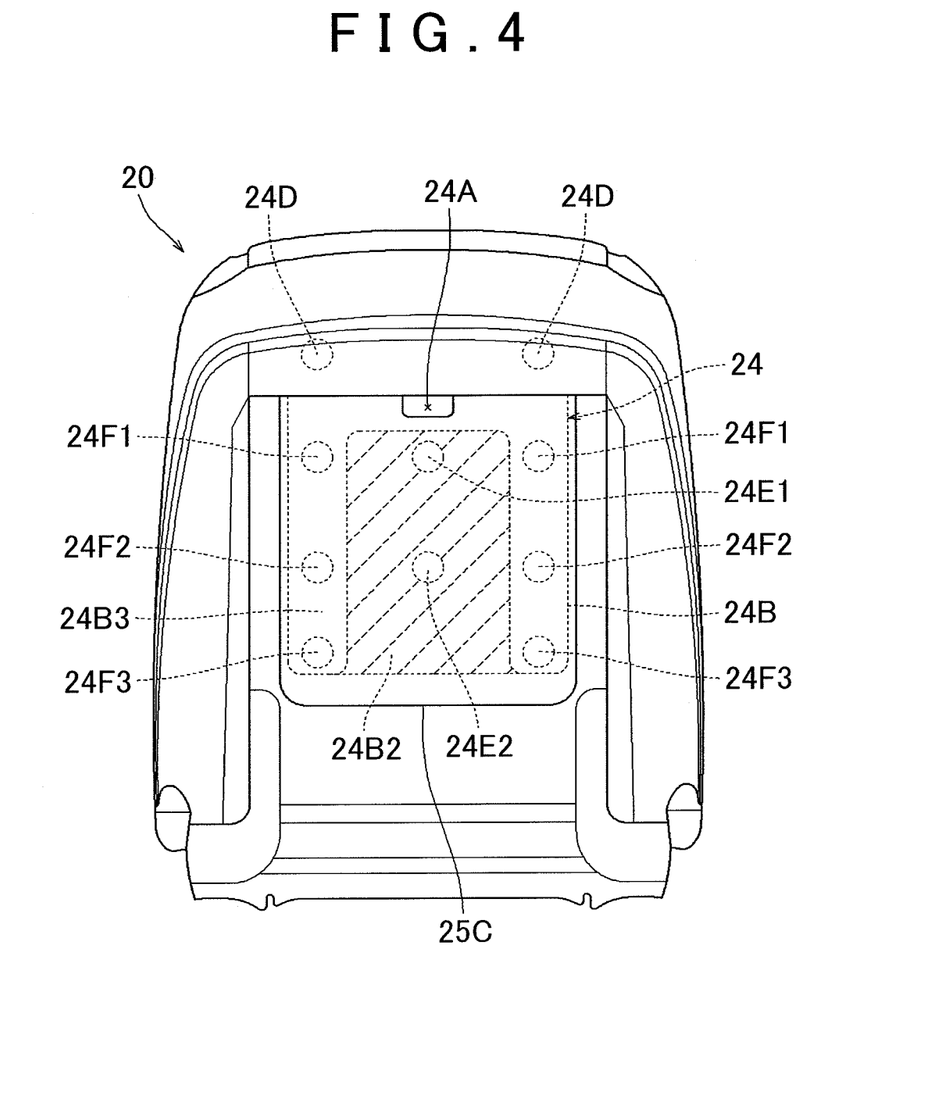
FIG. 4 is a rear view of the back pad as seen from the rear side according to the first embodiment.
Figure 5:
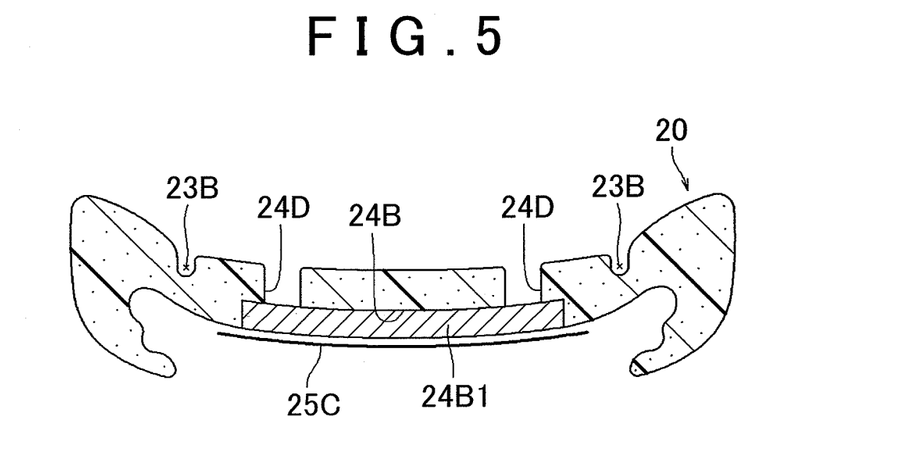
FIG. 5 is a cross-sectional view taken along line V-V of FIG. 3.
Figure 6:
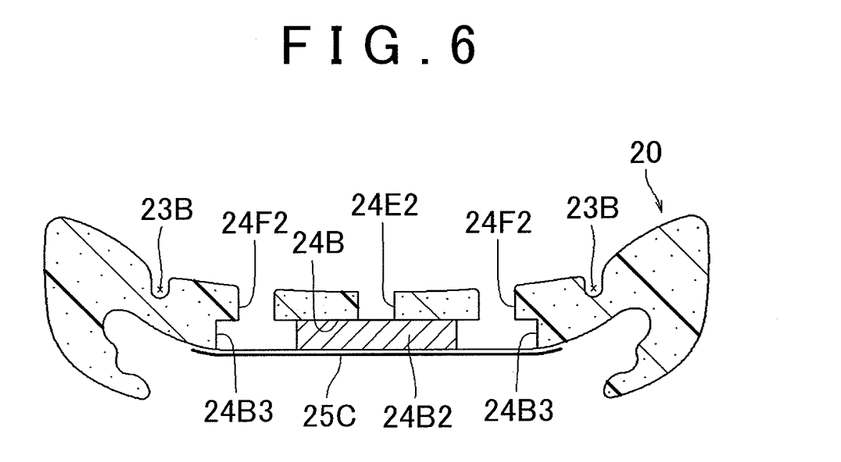
FIG. 6 is a cross-sectional view taken along line VI-VI of FIG. 3.

As shown in FIG. 1, a vehicle seat 1 of this embodiment is disposed as a driver's seat of an automobile and includes a seat back 2 serving as a backrest for a seated occupant, a seat cushion 3 serving as a seating portion, and a headrest 4 serving as a rest for the head of the seated occupant. As shown in FIG. 2, the seat back 2 is provided therein with a centrifugal fan 40 that can send air from the inside toward the seated occupant. Further, the seat back 2 is provided, on a rear surface (back surface) of a back pad 20 serving as an internal cushion material, with an air passage 24 that allows air from the fan 40 to flow widely and dispersively in directions along a rear surface of the seat back 2.

As shown in FIGS. 1 and 2, the seat back 2 mainly includes a back frame 10 constituting the skeleton of the seat back 2 and formed in a rectangular frame shape, the back pad 20 made of urethane foam and attached to a front surface of the back frame 10, and a fabric back cover 30 covering the entire surface of the back pad 20. Herein, the back pad 20 is an example of a "pad" in the claims. As shown in FIG. 2, the back frame 10 is configured in an inverted U-shape by assembling together a pair of left and right side frames 11, 11 each in the form of a vertically long steel plate, and an upper frame 12 in the form of an inverted U-shaped steel pipe bridged between upper end portions of the side frames 11, 11 and integrally joined thereto.

An upper panel 13 in the form of a horizontally long steel plate is bridged between and joined to both leg portions of the upper frame 12. Further, a lower panel 14 in the form of a horizontally long steel plate is bridged between and joined to lower portions of the side frames 11, 11. Consequently, the back frame 10 is configured in a rectangular frame shape by integrally assembling the upper frame 12, the side frames 11, 11, the upper panel 13, and the lower panel 14.

Outer surfaces on the lower end sides of the side frames 11, 11 are coupled to a skeleton frame of the seat cushion 3 via recliners (not shown), respectively, so that the back frame 10 is supported. Consequently, the backrest angle of the seat back 2 can be adjusted relative to the seat cushion 3. Since the coupling configuration between the seat back 2 and the seat cushion 3 via the recliners is known, a description thereof will be omitted.

As shown in FIG. 2, rectangular tube-shaped holders 12A, 12A are attached to the upper frame 12 of the back frame 10 at left and right two positions in the middle of the upper frame 12. The holders 12A, 12A serve as holding members for mounting the headrest 4 on an upper portion of the seat back 2.

As shown in FIG. 2, a support 15 is bridged between the upper panel 13 and the lower panel 14. The support 15 is in surface contact with a central lower portion 20B of the back pad 20 disposed on the front side of the support 15 and is configured to elastically support the central lower portion 20B of the back pad 20 from the rear side. The support 15 mainly includes a support spring 15A formed by bending a single steel wire into a bilaterally symmetrical generally U-shape and a lumbar plate 15B having a vertically long plate shape and disposed at a front surface portion in a lower area of the support spring 15A. The support spring 15A is provided in the state where both left and right end portions on the lower portion side of the support spring 15A bent in the generally U-shape are elastically supported from the rear side with respect to a front surface portion of the lower panel 14 by fish mouth springs 15D, 15D (torsion springs) each formed by winding a steel wire into an angular helical shape, respectively.

With this configuration, the lower end portion of the support spring 15A is constantly pressed toward the front side by elastic forces of the fish mouth springs 15D, 15D so that the lumbar plate 15B attached to the front surface of the support spring 15A is held in a state of being pressed against the rear surface of the back pad 20. In this state, the support spring 15A elastically supports the back pad 20 from the rear side while both end portions on the upper portion side of the support spring 15A are supported from the rear side with respect to the upper panel 13 and both end portions on the lower portion side of the support spring 15A are elastically supported from the rear side with respect to the lower panel 14 by the fish mouth springs 15D, 15D.

As shown in FIG. 2, the back pad 20 is formed by foaming a urethane resin into a thick mat shape and is configured to cover the back frame 10 from above so as to be attached thereto. As shown in FIG. 1, after the back pad 20 is attached to the back frame 10, the back cover 30 is placed to cover the entire surface of the back pad 20 and is stretched so that the back pad 20 is pressed against the back frame 10 by a stretching force of the back cover 30 so as to be fixed and held in position. Consequently, the outer peripheral portion of the back pad 20 is supported from the rear side by the frame shape of the back frame 10, while the central portion of the back pad 20 is surface-supported from the rear side by the support 15, so that the backrest load of the seated occupant is elastically and softly received from the rear side.

As shown in FIG. 2, the back pad 20 includes a central upper portion 20A configured to support the upper portion of the back, such as the shoulder blades, of the seated occupant, the central lower portion 20B configured to support the lower portion, from the middle of the back to the waist, of the seated occupant, and a pair of side portions 20C, 20C configured to support both side portions of the back of the seated occupant. The central upper portion 20A and the central lower portion 20B are each formed in a flat surface shape with relatively less ruggedness. Specifically, the surface shape of each of the central upper portion 20A and the central lower portion 20B is formed to be gradually recessed in a curved surface toward a formation portion of a central recess shaped horizontal stretching groove 23A extending in a horizontal line and serving as a border between the central upper portion 20A and the central lower portion 20B.

The side portions 20C, 20C are formed in shapes that respectively bulge forward in mountain shapes from formation portions of recess shaped vertical stretching grooves 23B, 23B, each extending in a vertical line and serving as a border between the corresponding side portion 20C and the central upper and lower portions 20A and 20B, toward the opposite outer sides. With these mountain shapes, the side portions 20C, 20C support both side portions of the back of the seated occupant from the outer sides. The horizontal stretching groove 23A and the vertical stretching grooves 23B, 23B formed on the front-side surface of the back pad 20 function as pulling grooves for pulling over and fixing a seam portion 31A and seam portions 31B, 31B of the back cover 30 (see FIG. 1) formed along the lines of the grooves, respectively. With these stretching configurations, even if the back cover 30 is placed to cover those rugged portions of the back pad 20 between the central upper portion 20A and the central lower portion 20B and between each side portion 20C and the central upper and lower portions 20A and 20B, the back cover 30 is stretched on the back pad 20 in a good-looking state without the occurrence of "floating" or "wrinkling" between the back cover 30 and the front-side surface of the back pad 20.

As shown in FIGS. 3 to 6, the recess shaped air passage 24 is formed on the rear surface of the back pad 20 across the areas of the central upper portion 20A and the central lower portion 20B. The air passage 24 allows air from the fan 40 (see FIG. 2) to flow widely and dispersively in the directions along the rear surface of the back pad 20. As shown in FIG. 2, the fan 40 is attached to a front surface of the upper panel 13 of the back frame 10 and blows air from an outlet 41A of a duct 41 attached to a lower portion of the fan 40. Hereinbelow, a specific configuration of the air passage 24 will be described in detail. The air passage 24 is configured by forming a partial recess shaped portion on the rear surface of the back pad 20, then partially disposing seat members in the form of three-dimensional fabrics, and then covering the rear surface of the back pad 20 with a non-permeable planar cover sheet 25C so that air dispersively flows in the closed internal passage.

Specifically, the air passage 24 is formed by a recess 24B having a rectangular shape in rear view and recessed forward from the rear surface of the back pad 20. As will be described later, the cover sheet 25C for covering the recess 24B to form the air passage 24 is disposed on the rear surface of the back pad 20 and a connecting port 24A to which the outlet 41A of the duct 41 coupled to the fan 40 (see FIG. 2) is connected is opened in the cover sheet 25C near the center of the central upper portion 20A. The recess 24B is provided on the rear surface of the back pad 20 across the areas of the central upper portion 20A and the central lower portion 20B. The size of the recess 24B is as follows: The area of the recess 24B is such that its upper end portion extends to the vicinity of an upper end portion of the central upper portion 20A, that its lower end portion extends to the vicinity of a vertical-direction center portion of the central lower portion 20B, and that its both left and right end portions extend to the vicinities of the vertical stretching grooves 23B, 23B. The depth of the recess 24B is about half the thickness of the back pad 20.

An upper three-dimensional fabric 24B1 is disposed in the upper part of the recess 24B. The dimension of the upper three-dimensional fabric 24B1 in the vertical direction is from the upper end portion of the recess 24B to the vicinity of an upper end portion of the connecting port 24A, the dimension thereof in the width direction is equal to the full width of the recess 24B, and the thickness thereof in the front-rear direction is equal to the depth of the recess 24B. Both end portions of the upper three-dimensional fabric 24B1 extend downward so that the upper three-dimensional fabric 24B1 has a generally inverted U-shape in front view. Further, a lower three-dimensional fabric 24B2 is disposed in the central lower part of the recess 24B. The dimension of the lower three-dimensional fabric 24B2 in the vertical direction is from the vicinity of a lower end portion of the connecting port 24A to the lower end portion of the recess 24B, the dimension thereof in the width direction is about half the width of the recess 24B, and the thickness thereof in the front-rear direction is equal to the depth of the recess 24B. The lower three-dimensional fabric 24B2 has a generally rectangular shape in front view and is disposed with respect to the center in the width direction. A portion, where neither the upper three-dimensional fabric 24B1 nor the lower three-dimensional fabric 24B2 is disposed, of the recess 24B has a generally inverted U-shape in front view and forms a U-shaped groove 24B3 recessed forward from the rear surface of the back pad 20. Behind the recess 24B, the non-permeable planar cover sheet 25C is disposed so as to cover the area of the recess 24B with a size greater than the area of the recess 24B over the entire periphery in front view. The cover sheet 25C is fixed to the rear surface of the back pad 20 such that the cover sheet 25C is bonded to a width portion, from the outer peripheral edge of the recess 24B to the outer peripheral edge of the cover sheet 25C, of the rear surface of the back pad 20 and is further bonded to rear surfaces of the upper three-dimensional fabric 24B1 and the lower three-dimensional fabric 24B2. Herein, the U-shaped groove 24B3 in the recess 24B is an example of a "first transverse air passage" in the claims. Further, the portion, where the upper three-dimensional fabric 24B1 is disposed, in the recess 24B or the portion, where the lower three-dimensional fabric 24B2 is disposed, in the recess 24B is an example of a "second transverse air passage" in the claims. Further, the upper three-dimensional fabric 24B1 or the lower three-dimensional fabric 24B2 is an example of a "resistant body" in the claims and the cover sheet 25C is an example of a "non-permeable planar member" in the claims.

The central upper portion 20A, located forward of the upper three-dimensional fabric 24B1, of the back pad 20 is formed, near corners at left and right upper portions of the upper three-dimensional fabric 24B1, with through holes 24D, 24D in the form of circular holes each passing through the back pad 20 in its thickness direction. The central upper portion 20A, located forward of the lower three-dimensional fabric 24B2, of the back pad 20 is formed, at a width-direction center portion of the lower three-dimensional fabric 24B2, with a through hole 24E1 in the form of a circular hole passing through the back pad 20 in its thickness direction. The central lower portion 20B, located forward of the lower three-dimensional fabric 24B2, of the back pad 20 is formed, at a width-direction center portion of the lower three-dimensional fabric 24B2, with a through hole 24E2 in the form of a circular hole passing through the back pad 20 in its thickness direction. The central upper portion 20A, located forward of the U-shaped groove 24B3, of the back pad 20 is formed, at the same vertical-direction positions as the through hole 24E1 on the left and right sides, with through holes 24F1, 24F1 in the form of circular holes each passing through the back pad 20 in its thickness direction. The central lower portion 20B, located forward of the U-shaped groove 24B3, of the back pad 20 is formed, at the same vertical-direction positions as the through hole 24E2 on the left and right sides, with through holes 24F2, 24F2 in the form of circular holes each passing through the back pad 20 in its thickness direction and is further formed, near lower end portions of the U-shaped groove 24B3 on the left and right sides, with through holes 24F3, 24F3 in the form of circular holes each passing through the back pad 20 in its thickness direction. Herein, the through holes 24D, 24E1, 24E2, 24F1, 24F2, and 24F3 are each an example of a "longitudinal air passage" in the claims.

Since the upper three-dimensional fabric 24B1 is interposed between the through holes 24D, 24D and the connecting port 24A and the rear surface of the upper three-dimensional fabric 24B1 is covered with the cover sheet 25C, air sent from the fan 40 passes through the upper three-dimensional fabric 24B1 so as to be supplied to the through holes 24D, 24D. Likewise, since the lower three-dimensional fabric 24B2 is interposed between the through holes 24E1 and 24E2 and the connecting port 24A and the rear surface of the lower three-dimensional fabric 24B2 is covered with the cover sheet 25C, air sent from the fan 40 passes through the lower three-dimensional fabric 24B2 so as to be supplied to the through holes 24E1 and 24E2. That is, the upper three-dimensional fabric 24B1 and the lower three-dimensional fabric 24B2 each function as a resistant body against air sent from the fan 40. On the other hand, since nothing is interposed between the through holes 24F1, 24F2, and 24F3 and the connecting port 24A so that the through holes 24F1, 24F2, and 24F3 and the connecting port 24A are directly connected with each other via the U-shaped groove 24B3 and since the rear surface of the U-shaped groove 24B3 is covered with the cover sheet 25C, air sent from the fan 40 is supplied to the through holes 24F1, 24F2, and 24F3 without receiving any resistance. Consequently, more air can be supplied to the through holes 24F1, 24F2, and 24F3 located at both side portions of the back of the seated occupant, i.e. the portions of the body of the seated occupant where more air needs to be supplied. On the other hand, less air can be supplied to the through holes 24D, 24D located at both shoulders of the seated occupant and to the through holes 24E1 and 24E2 located at the central portion of the back of the seated occupant, i.e. the portions of the body of the seated occupant where less air needs to be supplied.

The outer peripheral edge portion of the recess 24B and the rear surfaces of the upper three-dimensional fabric 24B1 and the lower three-dimensional fabric 24B2 are bonded and fixed to the cover sheet 25C, while the cover sheet 25C is in abutment with the support 15 so as to be supported by the back frame 10. In this event, since the upper three-dimensional fabric 24B1 and the lower three-dimensional fabric 24B2 are the members having elasticity in the front-rear direction (thickness direction), they function not only to ensure breathability, but also to suppress insufficient support for the body of the seated occupant due to squash of the recess 24B upon seating. That is, the upper three-dimensional fabric 24B1 and the lower three-dimensional fabric 24B2 contribute also as part of the cushion material supporting the body of the seated occupant.

Methods of manufacturing the back pad 20 will be described. The first method is as follows: First, a pad provided with the recess 24B on the rear surface of the back pad 20 is formed by a known method and then the upper three-dimensional fabric 24B1 and the lower three-dimensional fabric 24B2 cut into predetermined shapes in advance are bonded to a bottom surface (front surface) of the recess 24B. Then, the cover sheet 25C is bonded to the outer peripheral edge portion of the recess 24B and the rear surfaces of the upper three-dimensional fabric 24B1 and the lower three-dimensional fabric 24B2. The second method is as follows: First, a pad provided with the recess 24B on the rear surface of the back pad 20 is formed by a known method. Then, a three-dimensional fabric cut into a shape approximately the same as the external shape of the recess 24B in front view is placed at a predetermined position on the cover sheet 25C and then thermocompression molding is performed using a mold having a convex shape corresponding to the shape of the U-shaped groove 24B3. Consequently, the three-dimensional fabric is partially squashed into the shape of the U-shaped groove 24B3 and, simultaneously, is thermally bonded to the cover sheet 25C at this portion. As a result, a member equivalent to a member in which the upper three-dimensional fabric 24B1 and the lower three-dimensional fabric 24B2 cut in advance are bonded to predetermined portions of the cover sheet 25C is produced. Then, this member is bonded and fixed to the back pad 20 such that the side opposite to the side where the three-dimensional fabric is thermally bonded is in abutment with a bottom surface (front surface) of the recess 24B. According to the first method, it is possible to use the relatively expensive three-dimensional fabric only at necessary portions and thus to suppress an increase in cost. On the other hand, according to the second method, although the amount of use of the three-dimensional fabric increases, since the three-dimensional fabric can be formed into the required shape and attached to the cover sheet 25C at the same time, it is possible to improve the productivity.

Figure 7:
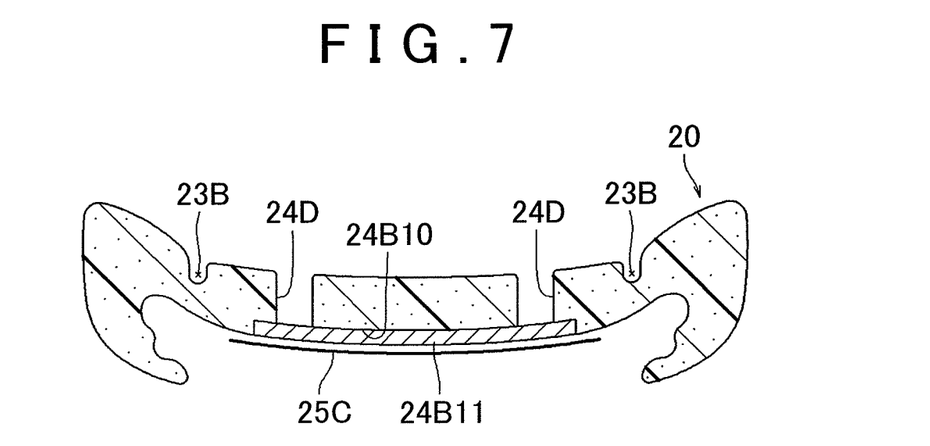
FIG. 7 is a cross-sectional view, corresponding to FIG. 5 of the first embodiment, according to a second embodiment of the invention.
Figure 8:
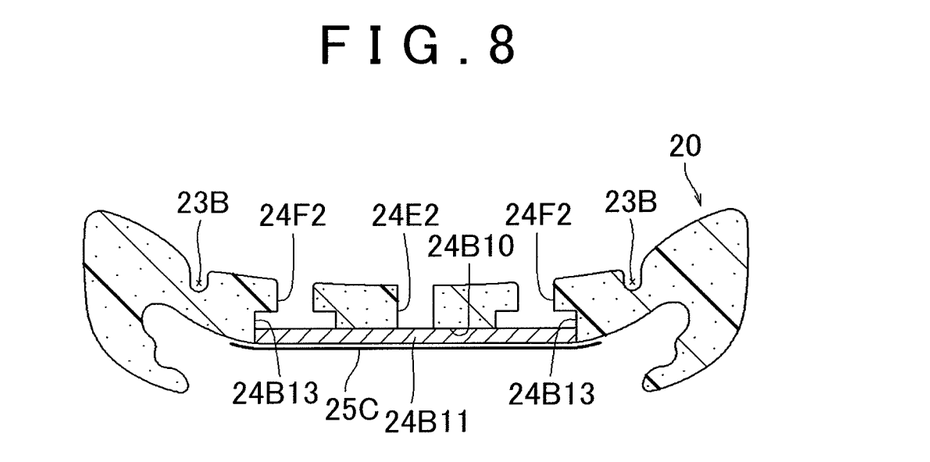
FIG. 8 is a cross-sectional view, corresponding to FIG. 6 of the first embodiment, according to the second embodiment of the invention.

FIGS. 7 and 8 show a second embodiment of the invention. A description of the same configuration as the first embodiment will be omitted by assigning the same symbols in the drawings. The second embodiment differs from the first embodiment in the arrangement of a three-dimensional fabric in a back pad 20 and the arrangement of an air passage formed thereby. In this embodiment, a recess 24B10 provided on a rear surface of the back pad 20 differs from the recess 24B in the first embodiment. That is, the recess 24B10 in this embodiment is the same as the recess 24B in the shape in front view and the arrangement in the back pad 20, but differs in the depth. The depth of the recess 24B10 is about ¼ of the thickness of the back pad 20 at portions corresponding to the portions where the upper three-dimensional fabric 24B1 and the lower three-dimensional fabric 24B2 are bonded in the first embodiment, while the depth of the recess 24B10 is about ½ of the thickness of the back pad 20 at a portion corresponding to the portion where the U-shaped groove 24B3 is formed in the first embodiment. Further, a three-dimensional fabric 24B11 in this embodiment is such that its thickness is about ¼ of the thickness of the back pad 20, that its shape is approximately the same as the external shape of the recess 24B in front view, and that a hole having approximately the same shape as the connecting port 24A is opened at a position corresponding to the connecting port 24A. Consequently, when the three-dimensional fabric 24B11 is inserted into and bonded to the recess 24B10, as shown in FIG. 7, in a cross section corresponding to FIG. 5, the thickness of the three-dimensional fabric 24B11 in abutment with through holes 24D, 24D is about ¼ of the thickness of the back pad 20. As shown in FIG. 8, in a cross section corresponding to FIG. 6, the thickness of the three-dimensional fabric 24B11 in abutment with a through hole 24E2 is about ¼ of the thickness of the back pad 20, while a U-shaped groove 24B13 having a depth of about ¼ of the thickness of the pack pad 20 is provided between through holes 24F2, 24F2 and the three-dimensional fabric 24B11.

With the configuration of this embodiment, as in the first embodiment, since the three-dimensional fabric 24B11 is interposed between the through holes 24D, 24D and the connecting port 24A and a rear surface of the three-dimensional fabric 24B11 is covered with a cover sheet 25C, air sent from a fan 40 passes through the three-dimensional fabric 24B11 so as to be supplied to the through holes 24D, 24D. Likewise, since the three-dimensional fabric 24B11 is interposed also between the through holes 24E1 and 24E2 and the connecting port 24A and the rear surface of the three-dimensional fabric 24B11 is covered with the cover sheet 25C, air sent from the fan 40 passes through the three-dimensional fabric 24B11 so as to be supplied to the through holes 24E1 and 24E2. That is, the three-dimensional fabric 24B11 functions as a resistant body against air sent from the fan 40. On the other hand, since nothing is interposed between the through holes 24F1, 24F2, and 24F3 and the connecting port 24A so that the through holes 24F1, 24F2, and 24F3 and the connecting port 24A are directly connected with each other via the U-shaped groove 24B13 and since a rear surface of the U-shaped groove 24B13 is covered with the cover sheet 25C via the three-dimensional fabric 24B11, air sent from the fan 40 is supplied to the through holes 24F1, 24F2, and 24F3 without receiving any resistance. Consequently, more air can be supplied to the through holes 24F1, 24F2, and 24F3 located at both side portions of the back of the seated occupant, i.e. the portions of the body of the seated occupant where more air needs to be supplied. On the other hand, less air can be supplied to the through holes 24D, 24D located at both shoulders of the seated occupant and to the through holes 24E1 and 24E2 located at the central portion of the back of the seated occupant, i.e. the portions of the body of the seated occupant where less air needs to be supplied. In this embodiment, compared to the first embodiment, since the thickness of the three-dimensional fabric is reduced by half, the amount of its use becomes about half and, further, processes of cutting the three-dimensional fabric into the required shape and bonding it to the back pad 20 are simplified. When a fan is used as an air suction mechanism via the through holes 24D, 24E1, 24E2, 24F1, 24F2, and 24F3, the flow of air becomes reverse to that described above in this paragraph.

While the specific embodiments have been described, the invention is not limited to the configurations thereof and various changes, additions, or deletions can be made within a range not departing from the gist of the invention.

For example, in the above-described embodiments, the three-dimensional fabric is used as the resistant body, but the invention is not limited thereto. A foam such as a urethane resin having an open-cell foam structure may be used.

In the above-described embodiments, the air passage 24 is disposed by providing the recess 24B, 24B10 on the rear surface of the back pad 20, but the invention is not limited thereto. The air passage 24 may be disposed at a thickness-direction center portion of the back pad 20 so as to extend along the rear surface.

In the above-described first embodiment, side surface portions (surfaces facing the U-shaped groove 24B3) of the three-dimensional fabrics 24B1 and 24B2 are in a breathable state, but the invention is not limited thereto. For example, a non-permeable film may be partially bonded to provide a non-breathable state, thereby delicately adjusting the supply/discharge amounts via the through holes 24D, 24E1, and 24E2.

In the above-described embodiments, the invention is applied to the seat back of the automobile, but the invention is not limited thereto. The invention may be applied to the seat cushion of the automobile and may also be applied to seats equipped in airplanes, ships, railway vehicles, and so on.

What is claimed is:

1. A vehicle seat comprising:
a pad configured to support a body of a seated occupant, wherein
the pad has a transverse air passage extending in a direction along a back surface of the pad and a plurality of longitudinal air passages each having one end connecting with the transverse air passage and the other end open to a front surface of the pad, and
the transverse air passage has a first transverse air passage connecting an air introduction hole from a fan and at least one of the plurality of longitudinal air passages directly with each other, and a second transverse air passage connecting the air introduction hole and at least another one of the plurality of longitudinal air passages with each other via a resistant body having a resistance against an air flow that is interposed between the air introduction hole and the at least another one of plurality of longitudinal air passages, wherein
the resistant body is a three-dimensional fabric,
the first transverse air passage and the second transverse air passage are defined by a recess shaped groove provided on the back surface side of the pad and a non-permeable planar member stretched on the back surface side of the pad, and
the three-dimensional fabric is disposed in abutment with the non-permeable planar member in the second transverse air passage.

2. The vehicle seat according to claim 1, wherein
the three-dimensional fabric has a size to cover the second transverse air passage and at least part of the first transverse air passage and is placed on the non-permeable planar member, and
the three-dimensional fabric is thermally bonded to the non-permeable planar member at a portion corresponding to the first transverse air passage.

3. The vehicle seat according to claim 1, wherein
when air is introduced into the second transverse air passage, the air flows from the air introduction hole to the at least another one of the plurality of longitudinal passages through the resistant body.

4. A vehicle seat comprising:

a pad configured to support a body of a seated occupant, wherein the pad has a transverse air passage extending in a direction along a back surface of the pad and a plurality of longitudinal air passages each having one end connecting with the transverse air passage and the other end open to a front surface of the pad, and the transverse air passage has a first transverse air passage connecting an air introduction hole from a fan and at least one of the plurality of longitudinal air passages directly with each other, and a second transverse air passage connecting the air introduction hole and at least another one of the plurality of longitudinal air passages with each other via a resistant body having a resistance against an air flow, wherein the resistant body is a three-dimensional fabric, the first transverse air passage and the second transverse air passage are defined by a recess shaped groove provided on the back surface side of the pad and a non-permeable planar member stretched on the back surface side of the pad, and the three-dimensional fabric is disposed in abutment with the non-permeable planar member in the second transverse air passage.

* * * * *